US012447948B2

(12) United States Patent
Chae et al.

(10) Patent No.: US 12,447,948 B2
(45) Date of Patent: Oct. 21, 2025

(54) DEVICE AND METHOD FOR CONTROLLING DYNAMIC BEHAVIOR OF A VEHICLE

(71) Applicants: HYUNDAI MOTOR COMPANY, Seoul (KR); KIA CORPORATION, Seoul (KR)

(72) Inventors: Min Ji Chae, Incheon (KR); Min Je Hyun, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 101 days.

(21) Appl. No.: 18/385,693

(22) Filed: Oct. 31, 2023

(65) Prior Publication Data

US 2024/0425036 A1  Dec. 26, 2024

(30) Foreign Application Priority Data

Jun. 20, 2023  (KR) .......... 10-2023-0079179

(51) Int. Cl.
*B60W 30/045*  (2012.01)
*B60W 10/18*  (2012.01)
(Continued)

(52) U.S. Cl.
CPC .......... *B60W 30/045* (2013.01); *B60W 10/18* (2013.01); *B60W 10/20* (2013.01);
(Continued)

(58) Field of Classification Search
CPC .... B60W 30/045; B60W 10/18; B60W 10/20; B60W 2520/06; B60W 2710/18;
(Continued)

(56) References Cited

U.S. PATENT DOCUMENTS 8,930,061 B2  1/2015  Ammon et al.
9,132,835 B2  9/2015  Yang et al.
(Continued)

FOREIGN PATENT DOCUMENTS

JP  4341534 B2  10/2009
JP  2020168955 A  10/2020
(Continued)

*Primary Examiner* — Yi-Kai Wang
(74) *Attorney, Agent, or Firm* — Lempia Summerfield Katz LLC

(57) ABSTRACT

A device for controlling a behavior of a vehicle identifies sensing data including at least one of a travel state of a host vehicle, an operation signal for the host vehicle, a lateral force acting on the host vehicle caused by cross-wind, or any combination using a sensor. The device also identifies an intention determination value related to an intention of a user using at least some of the sensing data. The device also identifies at least one of a braking control amount, a steering control amount for the host vehicle, or any combination using at least some of the sensing data when the sensing data and the intention determination value satisfy specified conditions. The device also compensates for a behavior of the host vehicle based on the braking control amount, the steering control amount, or any combination.

20 Claims, 9 Drawing Sheets

(51) Int. Cl.
*B60W 10/20* (2006.01)
*B62D 15/02* (2006.01)

(52) U.S. Cl.
CPC ....... *B62D 15/021* (2013.01); *B60W 2520/06* (2013.01); *B60W 2710/18* (2013.01); *B60W 2710/20* (2013.01)

(58) Field of Classification Search
CPC ....... B60W 2710/02; B60W 2510/202; B60W 2520/10; B60W 2520/125; B60W 2540/18; B60W 2552/40; B60W 30/02; B60W 2710/207; B60W 2420/403; B60W 2420/408; B60W 2520/105; B60W 2520/14; B60W 2520/28; B60W 40/1005; B60W 2050/0052; B60W 2520/20; B60W 2552/05; B60W 2552/15; B62D 15/021; B62D 6/003; B62D 6/04; B60Y 2300/02
USPC .......................................................... 701/41
See application file for complete search history.

(56) References Cited

U.S. PATENT DOCUMENTS

| | | |
|---|---|---|
| 11,066,098 B2 | 7/2021 | Mitsumoto |
| 11,358,638 B2 | 6/2022 | Mitsumoto |
| 11,400,940 B2 | 8/2022 | Neubecker et al. |
| 2006/0206253 A1* | 9/2006 | Yu .......................... B62D 6/002 701/70 |
| 2020/0172164 A1 | 6/2020 | Mitsumoto |
| 2020/0317266 A1 | 10/2020 | Kunihiro et al. |
| 2021/0016829 A1 | 1/2021 | Mitsumoto |
| 2024/0043017 A1* | 2/2024 | Young ............... B60W 60/0015 |
| 2024/0253616 A1* | 8/2024 | Jeon ..................... B60W 10/18 |

FOREIGN PATENT DOCUMENTS

| | | |
|---|---|---|
| JP | 7070376 B2 | 5/2022 |
| JP | 7095661 B2 | 7/2022 |
| KR | 100792918 B1 | 1/2008 |
| KR | 20210065234 A | 6/2021 |

* cited by examiner

DEVICE AND METHOD FOR CONTROLLING DYNAMIC BEHAVIOR OF A VEHICLE

CROSS-REFERENCE TO RELATED APPLICATIONS

This application claims the benefit of priority to Korean Patent Application No. 10-2023-0079179, filed in the Korean Intellectual Property Office on Jun. 20, 2023, the entire contents of which are incorporated herein by reference.

TECHNICAL FIELD

The present disclosure relates to a device and a method for controlling a dynamic behavior of a vehicle. More specifically, the present disclosure relates to a technology for compensating for a vehicle behavior using at least one of an intention of a user, a travel state of a host vehicle, or a road surface state, or any combination thereof when a lateral force acting on the host vehicle by cross-wind exceeds a specified strength.

BACKGROUND

In general, a motor driven power steering (MDPS) system is installed in a vehicle. The MDPS system changes a steering force of a steering wheel based on a travel speed of a host vehicle and provides a steering assist force by motor driving to a steering shaft connected to the steering wheel.

In addition, the motor driven power steering (MDPS) system performs lateral force compensation control of compensating for a steering torque to prevent vehicle pulls resulted from a lateral load.

The lateral force compensation control by the MDPS system is composed of an operation of determining, by a controller, whether actual steering has occurred or a lateral force has generated based on sensing signals of a steering angle sensor, a yaw rate sensor, and a vehicle speed sensor. The MDPS system is also composed of an operation of performing, by the controller, the steering torque compensation control when it is determined that the lateral force has generated.

However, a method according to the prior art has a problem in that the conventional steering torque compensation effect is not exerted when an excessive lateral load (e.g., cross-wind with a speed equal to or higher than 40 KPH) occurs while the vehicle is traveling.

For example, when the excessive lateral force (the cross-wind with the speed equal to or higher than 40 KPH) occurs, a required compensating steering torque should be equal to or greater than 2 Nm, but only torque compensation of a maximum level of about 0.4 Nm is achieved, so that the conventional steering torque compensation effect is not exerted.

Furthermore, the method according to the prior art has a problem of not considering an interaction with a user (or a driver) when performing the compensation control based on the generation of the lateral force. Accordingly, there is an inconvenience that the user has to perform unnecessary control intervention. In addition, as control of a type different from an intention of the user is performed, the user experiences a sense of heterogeneity while traveling.

SUMMARY

The present disclosure has been made to solve the above-mentioned problems occurring in the prior art while advantages achieved by the prior art are maintained intact.

Aspects of the present disclosure provide a device and a method for controlling a behavior of a vehicle that determine a lateral force acting on a host vehicle. The device and the method also perform compensation for the vehicle behavior further considering a vehicle behavior compensated in advance by a user in a process of identifying a control amount (e.g., a braking control amount and/or a steering control amount) for control of the host vehicle.

Other aspects of the present disclosure provide a device and a method for controlling a behavior of a vehicle that perform compensation control only under a situation in which the compensation control by a control device is actually required by determining whether to perform the compensation control by further considering parameters related to an intention of a user.

Still other aspects of the present disclosure provide a device and a method for controlling a behavior of a vehicle that stabilize the behavior of the vehicle by calculating a braking control amount and a steering control amount using a travel state of a host vehicle, a structure of the host vehicle, or the like. The device and the method also perform cooperative control using the calculated control amounts.

The technical problems to be solved by the present disclosure are not limited to the aforementioned problems. Any other technical problems not mentioned herein should be more clearly understood from the following description by those having ordinary skill in the art to which the present disclosure pertains.

According to an aspect of the present disclosure, a device for controlling a behavior of a vehicle includes a sensor having at least one sensor, a memory that stores instructions, and a controller operatively connected to the sensor and the memory. For example, the instructions, when executed by the controller, cause the device to identify sensing data including at least one of a travel state of a host vehicle, an operation signal for the host vehicle, a lateral force acting on the host vehicle caused by cross-wind, or any combination using the sensor. The device is also caused to identify an intention determination value related to an intention of a user using at least some of the sensing data. The device is also caused to identify at least one of a braking control amount, a steering control amount for the host vehicle, or any combination using at least some of the sensing data when the sensing data and the intention determination value satisfy specified conditions. The device is also caused to compensate for a behavior of the host vehicle based on the braking control amount, the steering control amount, or any combination.

In one embodiment, the instructions, when executed by the controller, may cause the device to obtain raw data including at least one of a steering angle, a wheel speed, a yaw-rate, a lateral acceleration, a longitudinal acceleration, an ADAS signal of the host vehicle, or any combination using the sensor. The device may also be caused to identify the sensing data generated by performing at least one of offset compensation, filter processing, or any combination on at least some of the raw data.

In one embodiment, the instructions, when executed by the controller, may cause the device to identify the sensing data including at least one of a vehicle speed of the host vehicle, a sideslip angle change rate, a heel angle of a road, a type of the road, a degree of danger, a friction coefficient between a tire of the host vehicle and the road, or any combination using the sensor.

In one embodiment, the instructions, when executed by the controller, may cause the device to, when the lateral force is equal to or greater than a specified value, identify a requested steering angle required to compensate for the lateral force, using at least one of a cornering stiffness of at least one wheel of the host vehicle, a wheelbase, a first distance from a center of gravity of the host vehicle to a center of the at least one wheel, a second distance from the center of gravity of the host vehicle to a lateral force acting point, or any combination. The device may also be caused to identify the compensating steering angle by the user for control of the host vehicle.

In one embodiment, the instructions, when executed by the controller, may cause the device to determine that the lateral force among the sensing data satisfies a first condition among the specified conditions when the lateral force is equal to or greater than a reference lateral force and a differential value of the lateral force is equal to or greater than a reference differential value. The device may also be caused to determine that the travel state satisfies a second condition among the specified conditions when a dynamic behavior index value identified using a steering angle and a steering angle velocity of the host vehicle is equal to or smaller than a preset value and when a travel speed of the host vehicle is equal to or higher than a specified speed.

In one embodiment, the instructions, when executed by the controller, may cause the device to identify a requested steering angle required to compensate for the lateral force and a compensating steering angle input by a user, using the sensor. The device may also be caused to identify the intention determination value as 1 when a steering torque is equal to or smaller than a reference steering torque. The device may also be caused to identify the intention determination value as 2 when the steering torque exceeds the reference steering torque and the compensating steering angle is equal to or smaller than a reference compensating steering angle. The device may also be caused to identify the intention determination value as 3 when the compensating steering angle exceeds the reference compensating steering angle and is smaller than the requested steering angle. The device may also be caused to determine that the intention determination value satisfies a third condition among the specified conditions when the intention determination value is any one of 1, 2, or 3 or when the lateral force cannot be compensated through a manipulation of the user.

In one embodiment, the instructions, when executed by the controller, may cause the device to determine that the sensing data and the intention determination value do not satisfy the specified conditions when the lateral force is smaller than a specified value, when a friction coefficient between a tire of the host vehicle and a road is equal to or smaller than a threshold value, when a heel angle and a type of the road do not satisfy a threshold criterion, when a yaw-rate value of the host vehicle is equal to or greater than a reference value, when a sideslip angle change rate exceeds a specified range, or when the compensating steering angle is equal to or greater than the requested steering angle.

In one embodiment, a case that the lateral force cannot be compensated through the manipulation of the user comprises a first case that the user is in a hands-off state, a second case that the manipulation for compensating for the lateral force is not received from the user, a third case that the lateral force is not compensated for by the manipulation received from the user, or any combination thereof.

In one embodiment, the instructions, when executed by the controller, may cause the device to identify a requested steering angle required to compensate for the lateral force and a compensating steering angle input by a user, using the sensor. The device may also be caused to determine a distribution ratio for identifying the braking control amount using a steering torque by the user. The device may also be caused to identify the braking control amount using at least one of the lateral force, a cornering stiffness of at least one wheel of the host vehicle, a wheelbase, a first distance from a center of gravity of the host vehicle to a center of the at least one wheel, a second distance from the center of gravity of the host vehicle to a lateral force acting point, the compensating steering angle, the distribution ratio, or any combination. The device may also be caused to identify the steering control amount using at least one of the lateral force, the cornering stiffness of the at least one wheel of the host vehicle, the first distance, the second distance, the compensating steering angle, the braking control amount, or any combination. The device may also be caused to compensate for the behavior of the host vehicle based on the braking control amount, the steering control amount, or any combination.

In one embodiment, the instructions, when executed by the controller, may cause the device to perform post-processing related to at least one of a maximum value, a minimum value, a slope, or any combination on the braking control amount and the steering control amount. The device may also be caused to identify braking pressures respectively corresponding to a front wheel and a rear wheel of the host vehicle based on a final yaw moment identified via a result of the post-processing. The device may also be caused to identify a final steering torque corresponding to the steering control amount via the result of the post-processing. The device may also be caused to compensate for the behavior of the host vehicle using at least one of the braking pressures or the final steering torque, or any combination.

According to another aspect of the present disclosure, a method for controlling a behavior of a vehicle includes identifying, by a controller, sensing data including at least one of a travel state of a host vehicle, an operation signal for the host vehicle, a lateral force acting on the host vehicle caused by cross-wind, or any combination using a sensor. The method also includes identifying, by the controller, an intention determination value related to an intention of a user using at least some of the sensing data. The method also includes identifying, by the controller, at least one of a braking control amount, a steering control amount for the host vehicle, or any combination using at least some of the sensing data when the sensing data and the intention determination value satisfy specified conditions. The method also includes compensating, by the controller, for a behavior of the host vehicle based on the braking control amount, the steering control amount, or any combination.

In one embodiment, identifying, by the controller, the sensing data using the sensor may include obtaining, by the controller, raw data including at least one of a steering angle, a wheel speed, a yaw-rate, a lateral acceleration, a longitudinal acceleration, an ADAS signal of the host vehicle, or any combination using the sensor. Identifying, by the controller, the sensing data using the sensor may also include identifying the sensing data generated by performing at least one of offset compensation, filter processing, or any combination on at least some of the raw data.

In one embodiment, identifying, by the controller, the sensing data using the sensor may include identifying, by the controller, the sensing data including at least one of a vehicle speed of the host vehicle, a sideslip angle change rate, a heel angle of a road, a type of the road, a degree of danger, a friction coefficient between a tire of the host vehicle and the road, or any combination using the sensor.

In one embodiment, identifying, by the controller, at least one of the braking control amount, the steering control amount, or any combination may include, when the lateral force is equal to or greater than a specified value, identifying, by the controller, a requested steering angle required to compensate for the lateral force, using at least one of a cornering stiffness of at least one wheel of the host vehicle, a wheelbase, a first distance from a center of gravity of the host vehicle to a center of the at least one wheel, a second distance from the center of gravity of the host vehicle to a lateral force acting point, or any combination. Identifying, by the controller, at least one of the braking control amount, the steering control amount, or any combination may include, when the lateral force is equal to or greater than a specified value, identifying a compensating steering angle by the user for control of the host vehicle.

In one embodiment, identifying, by the controller, at least one of the braking control amount, the steering control amount, or any combination may include determining, by the controller, that the lateral force among the sensing data satisfies a first condition among the specified conditions when the lateral force is equal to or greater than a reference lateral force and a differential value of the lateral force is equal to or greater than a reference differential value of the lateral force. Identifying, by the controller, at least one of the braking control amount, the steering control amount, or any combination may also include determining, by the controller, that the travel state satisfies a second condition among the specified conditions when a dynamic behavior index value identified using a steering angle and a steering angle velocity of the host vehicle is equal to or smaller than a preset value, and a travel speed of the host vehicle is equal to or higher than a specified speed.

In one embodiment, identifying, by the controller, at least one of the braking control amount, the steering control amount, or any combination may include identifying the intention determination value as 1 when a steering torque is equal to or smaller than a reference steering torque, as 2 when the steering torque exceeds the reference steering torque and a compensating steering angle is equal to or smaller than a reference compensating steering angle, and as 3 when the compensating steering angle exceeds the compensating steering angle and is smaller than a requested steering angle. Identifying, by the controller, at least one of the braking control amount, the steering control amount, or any combination may include determining that the intention determination value satisfies a third condition among the specified conditions when the intention determination value is any one of 1 to 3 or in case the lateral force cannot be compensated through a manipulation of the user.

In one embodiment, identifying, by the controller, at least one of the braking control amount or the steering control amount, or any combination may include determining, by the controller, that the sensing data and the intention determination value do not satisfy the specified conditions when the lateral force is smaller than a specified value, when a friction coefficient between a tire of the host vehicle and a road is equal to or smaller than a threshold value, when a heel angle and a type of the road do not satisfy a threshold criterion, when a yaw-rate value of the host vehicle is equal to or greater than a reference value, when a sideslip angle change rate exceeds a specified range, or when the compensating steering angle is equal to or greater than the requested steering angle.

In one embodiment, wherein the case that the lateral force cannot be compensated through an operation of the user comprises a first case that the user is in a hands-off state, a second case that the manipulation for compensating for the lateral force is not received from the user, a third case that the lateral force is not compensated for by the manipulation received from the user, or any combination thereof.

In one embodiment, identifying, by the controller, at least one of the braking control amount, the steering control amount, or any combination may include identifying, by the controller, a requested steering angle required to compensate for the lateral force and a compensating steering angle input by a user, using the sensor. Identifying, by the controller, at least one of the braking control amount, the steering control amount, or any combination may also include determining, by the controller, a distribution ratio for identifying the braking control amount using the steering torque by the user.

Identifying, by the controller, at least one of the braking control amount, the steering control amount, or any combination may also include identifying, by the controller, the braking control amount using at least one of the lateral force, a cornering stiffness of at least one wheel of the host vehicle, a wheelbase, a first distance from a center of gravity of the host vehicle to a center of the at least one wheel, a second distance from the center of gravity of the host vehicle to a lateral force acting point, the compensating steering angle, the distribution ratio, or any combination. Identifying, by the controller, at least one of the braking control amount, the steering control amount, or any combination may also include identifying, by the controller, the steering control amount using at least one of the lateral force, the cornering stiffness of the at least one wheel of the host vehicle, the first distance, the second distance, the compensating steering angle, the braking control amount, or any combination. Identifying, by the controller, at least one of the braking control amount, the steering control amount, or any combination may also include compensating, by the controller, for the behavior of the host vehicle based on the braking control amount, the steering control amount, or any combination.

In one embodiment, compensating, by the controller, for the behavior of the host vehicle based on the braking control amount, the steering control amount, or any combination may include performing, by the controller, post-processing related to at least one of a maximum value, a minimum value, a slope, or any combination on the braking control amount and the steering control amount. Compensating, by the controller, for the behavior of the host vehicle based on the braking control amount, the steering control amount, or any combination may also include identifying, by the controller, braking pressures respectively corresponding to a front wheel and a rear wheel of the host vehicle based on a final yaw moment identified via a result of the post-processing. Compensating, by the controller, for the behavior of the host vehicle based on the braking control amount, the steering control amount, or any combination may also include identifying, by the controller, a final steering torque corresponding to the steering control amount via the result of the post-processing. Compensating, by the controller, for the behavior of the host vehicle based on the braking control amount, the steering control amount, or any combination may also include compensating, by the controller, for the behavior of the host vehicle using at least one of the braking pressures, the final steering torque, or any combination.

BRIEF DESCRIPTION OF THE DRAWINGS

The above and other objects, features, and advantages of the present disclosure should be more apparent from the following detailed description taken in conjunction with the accompanying drawings, in which.

With regard to the description of the drawings, the same or similar reference numerals may be used for the same or similar elements.

DETAILED DESCRIPTION

Figure 1:
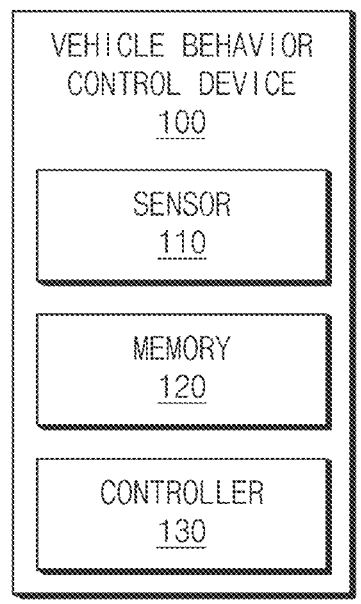
FIG. 1 is a block diagram showing components of a vehicle behavior control device according to an embodiment of the present disclosure.

Hereinafter, some embodiments of the present disclosure are described in detail with reference to the drawings. In adding the reference numerals to the components of each drawing, it should be noted that the identical or equivalent components are designated by the identical numeral even when the components are displayed on different drawings. Further, in describing the embodiments of the present disclosure, a detailed description of the related known configuration or function has been omitted where it has been determined that the detailed description would interfere with the understanding of the embodiments of the present disclosure.

In describing the components of the embodiments according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meanings as commonly understood by one of ordinary skill in the art to which the present disclosure belongs. It should be further understood that terms, such as those defined in commonly used dictionaries, should be interpreted as having a meaning that is consistent with their meanings in the context of the relevant art and should not be interpreted in an idealized or overly formal sense unless expressly so defined herein. When a component, device, element, or the like of the present disclosure is described as having a purpose or performing an operation, function, or the like, the component, device, element, or the like should be considered herein as being "configured to" meet that purpose or to perform that operation or function. Each of the component, device, element, and the like may separately embody or be included with a processor and a memory, such as a non-transitory computer readable media, as part thereof.

Hereinafter, embodiments of the present disclosure are described in detail with reference to FIGS. 1-9.

FIG. 1 is a block diagram showing components of a vehicle behavior control device according to an embodiment of the present disclosure.

According to one embodiment, a vehicle behavior control device 100 may include at least one of a sensor element 110, a memory 120, a controller 130, or any combination thereof. The configuration of the vehicle behavior control device 100 shown in FIG. 1 is exemplary, and embodiments of the present disclosure are not limited thereto. For example, the vehicle behavior control device 100 may further include components (e.g., at least one of an interface, a communication device, a display, or any combination thereof) not shown in FIG. 1.

According to one embodiment, the sensor element 110 may obtain (or identify) various information used for travel of a host vehicle and/or various information related to a travel state of the host vehicle.

For example, the sensor element 110 may include at least one sensor including at least one of a camera, a radar, a LiDAR, or any combination thereof.

For example, the sensor element 110 may identify sensing data including at least one of the travel state of the host vehicle, an operation signal for the host vehicle, a lateral force acting on the host vehicle caused by cross-wind, or any combination thereof.

For example, the sensor element 110 may identify a steering torque and a steering angle of the host vehicle. The steering torque may be generated by control of a user and may include a torque value and/or a steering angle used for steering control of the host vehicle.

For example, the sensor element 110 may identify at least one of a wheel speed, a yaw-rate, a lateral acceleration, or a longitudinal acceleration of the host vehicle, or any combination thereof. The sensor element 110 may obtain, for example, raw data including at least one of the steering angle, the wheel speed, the yaw-rate, the lateral acceleration, the longitudinal acceleration, an ADAS signal of the host vehicle, or any combination thereof. The sensor 110 may also identify the sensing data generated by performing at least one of offset compensation or filter processing or identify any combination of at least some of the raw data.

For example, the sensor element 110 may identify at least one advanced driver assistance system (ADAS) signal used for controlling the host vehicle. The controller 130 may determine whether to perform vehicle behavior control by determining a priority between the at least one ADAS signal and an output signal for the vehicle behavior control. For example, when some of the at least one ADAS signal have a higher priority than the output signal for the vehicle behavior control, even when all specified conditions for the vehicle behavior control are satisfied, the controller 130 may suspend the vehicle behavior control until processing of some of the at least one ADAS signal is completed.

For example, the sensor element 110 may identify the sensing data including at least one of a vehicle speed of the host vehicle, a sideslip angle change rate, a heel angle of a road, a type of the road, a degree of danger, a friction coefficient between a tire of the host vehicle and the road, or any combination thereof.

For example, the sensor element 110 may identify the operation signal for the host vehicle input by the user to control the host vehicle.

For example, the sensor element 110 may identify a compensating steering angle input by the user. For example, the compensating steering angle may include an angle corresponding to a manipulation amount of the user manipulating a steering wheel for the steering control of the host vehicle.

For example, the sensor element 110 may identify the lateral force acting on the host vehicle by the cross-wind.

For example, the sensor element 110 may identify a strength of the lateral force acting on at least one point (e.g., a lateral force acting point) of the host vehicle.

According to one embodiment, the memory 120 may store instructions or data. For example, the memory 120 may store one or more instructions that, when executed by the controller 130, cause the vehicle behavior control device 100 to perform various operations.

For example, the memory 120 and the controller 130 may be implemented as one chipset. The controller 130 may include at least one of a communication processor or a modem.

For example, the memory 120 may store various information related to the vehicle behavior control device 100. For example, the memory 120 may store information on an operation history of the controller 130. For example, the memory 120 may store information related to states and/or operations of the components (e.g., at least one of an engine control unit (ECU), the sensor element 110, the controller 130, or any combination thereof) of the host vehicle.

For example, the memory 120 may store various information on the host vehicle. For example, the memory 120 may store at least one of a cornering stiffness of each of at least one wheel (e.g., a front wheel and a rear wheel) of the host vehicle, a wheelbase, a distance from a center of gravity of the host vehicle to a center of each of the at least one wheel, or any combination thereof.

For example, the memory 120 may replace the above-described information with update information on the host vehicle obtained (or identified) by the controller 130 in real time via the sensor element 110 and may store the update information.

According to one embodiment, the controller 130 may be operatively connected to the sensor element 110 and/or the memory 120. For example, the controller 130 may control the operations of the sensor element 110 and/or the memory 120.

For example, the controller 130 may identify the sensing data including at least one of the travel state of the host vehicle, the operation signal (e.g., the signal input by the user) of the host vehicle, the lateral force acting on the host vehicle by the cross-wind, or any combination thereof using the sensor element 110.

As an example, the controller 130 may obtain the raw data including at least one of the steering angle, the wheel speed, the yaw-rate, the lateral acceleration, the longitudinal acceleration, the ADAS signal of the host vehicle, or any combination thereof using the sensor element 110.

For example, the controller 130 may identify the sensing data generated by performing at least one of the offset compensation or the filter processing or identify any combination thereof on at least some of the raw data.

For example, the controller 130 may identify the sensing data including at least one of the vehicle speed of the host vehicle, the sideslip angle change rate, the heel angle of the road, the type of the road, the degree of danger, the friction coefficient between the tire of the host vehicle and the road, or any combination thereof using the sensor element 110.

For example, the controller 130 may identify a requested steering angle required to compensate for the lateral force and the compensating steering angle input by the user using at least some of the sensing data.

For example, the controller 130 may identify an intention determination value related to an intention of the user. The controller 130, for example, may identify requested steering angle required to compensate for the lateral force and the compensating steering angle input by the user. The controller 130 may identify an intention determination value related to an intention of the user using at least one of the steering torque, the requested steering angle, the compensating steering angle of the user, or any combination thereof.

For example, the requested steering angle may include a steering angle calculated by the controller 130 to compensate for the lateral force using at least one of the cornering stiffness of the at least one wheel of the host vehicle, the wheelbase, a first distance from the center of gravity of the host vehicle to the center of the at least one wheel, a second distance from the center of gravity of the host vehicle to the lateral force acting point, or any combination thereof.

For example, the controller 130 may identify the requested steering angle via Mathematical Equation 1 below.

$$A = \frac{(F_w(l_N + l_W)(C_f + C_r) + C_f C_r L\ \delta_{req})V_x}{l^2 C_f C_r \left[1 - \frac{m(l_f C_f - l_r C_r)}{l^2 C_f C_r} V_x^2\right]} \quad \text{[Mathematical Equation 1]}$$

As an example, $\delta_{req}$ may be the requested steering angle, $F_W$ may be the lateral force, 'l' may be the wheelbase, $l_w$ may be the second distance from the center of gravity of the host vehicle to the lateral force acting point, $C_f$ may be a cornering stiffness of a front wheel of the host vehicle, and $C_r$ may be a cornering stiffness of a rear wheel of the host vehicle. Further, 'L' may be a sum of a distance $l_f$ from the center of gravity of the host vehicle to a center of the front wheel and a distance $l_r$ from the center of gravity of the host vehicle to a center of the rear wheel. Also, 'm' may be a weight of the host vehicle, $V_x$ may be the vehicle speed of the host vehicle, and 'A' may be the yaw-rate. For example, $l_N$ may be a value identified via Mathematical Equation 2 below.

$$l_N = \frac{l_f C_f - l_r C_r}{(C_f + C_r)} \quad \text{[Mathematical Equation 2]}$$

As an example, the controller 130 may calculate the requested steering angle based on Mathematical Equation 1 assuming that the yaw-rate 'A' is 0. When the yaw-rate 'A' is 0, the requested steering angle may be identified via Mathematical Equation 3 below.

$$\delta_{req} = -\frac{F_w(l_N + l_W)(C_f + C_r)}{(C_f C_r L)} \quad \text{[Mathematical Equation 3]}$$

As an example, the compensating steering angle may include an angle of steering by the user for control (e.g., the steering control) of the host vehicle.

For example, the controller 130 may identify an intention determination value related to an intention of the user using at least one of the steering torque, the requested steering angle, the compensating steering angle of the user, or any combination thereof.

For example, the controller 130 may identify the intention determination value as 1 when the steering torque is equal to or smaller than a reference steering torque. For example, the case in which the intention determination value is 1 may include a case in which the user is in a hands-off state. For example, the hands-off may include a state in which the user does not grip the steering wheel. In other words, the case where the intention determination value is 1 may include a case where the user has no intention to control the compensation of the lateral force that enables the user's vehicle.

For example, the controller 130 may identify the intention determination value as 2 when the steering torque exceeds a reference steering torque and the compensating steering angle is equal to or smaller than a reference compensating steering angle. For example, the case in which the intention determination value is 2 may include a case in which the user does not perform the manipulation (e.g., lateral force compensation control) for controlling the host vehicle. In other words, the case where the intention determination value is 2 may include a case where the user has no intention to perform control for compensating for the lateral force acting on the vehicle.

As an example, the controller 130 may identify the intention determination value as 3 when the compensating steering angle exceeds a reference compensating steering angle and is smaller than the requested steering angle. For example, the case where the intention determination value is 3 may indicate an intention of the user that the compensation for the lateral force acting on the host vehicle is not sufficiently performed by the user. In other words, the case where the intention determination value is 3 may include a case where the user has the intention to perform control for compensating for the lateral force acting on the vehicle, but the lateral force is not compensated for by the user's manipulation. For example, the case where the intention determination value is 3 may include a situation in which compensation by user manipulation is insufficient to compensate for the lateral force.

As an example, the controller 130 may identify the intention determination value as 4 when the compensating steering angle is equal to or greater than the requested steering angle. The case where the intention determination value is 4 may indicate an intention of the user that the compensation for the lateral force acting on the host vehicle is sufficiently performed by the user. In other words, the case where the intention determination value is 4 may include a case where the user has the intention to perform control for compensating for the lateral force acting on the vehicle and the user's manipulation is sufficient to compensate for the lateral force as a result.

Regarding the above-described intention determination value, the case where the intention determination value is any one of 1, 2, or 3 may eventually include a situation in which the lateral force acting on the own vehicle cannot be sufficiently compensated only by the user's manipulation.

For example, the controller 130 may determine whether the sensing data and the intention determination value satisfy the specified conditions including at least one of a first condition, a second condition, a third condition, or any combination thereof.

For example, the first condition may include a case in which the lateral force acting on the host vehicle is equal to or greater than a reference lateral force and a differential value of the lateral force is equal to or greater than a reference differential value of the lateral force. For example, a case in which the controller 130 determines that the first condition is satisfied may include a case in which compensation control via the vehicle behavior control device 100 is required because the magnitude of the lateral force is excessive.

For example, the second condition may include a case in which a dynamic behavior index value identified using the steering angle and a steering angle velocity of the host vehicle is equal to or smaller than a preset value and the travel speed of the host vehicle is equal to or greater than a specified speed. For example, a case in which the controller 130 determines that the second condition is satisfied may include a case in which a behavior of the host vehicle is stable enough to enable the compensation control via the vehicle behavior control device 100.

As an example, the third condition may include a case in which the intention determination value representing the intention of the user is equal to or smaller than 3. For example, when the intention determination value is any one of 1 to 3 (e.g., any one of 1, 2, and 3), the controller 130 may determine that the intention determination value satisfies the third condition among the specified conditions. For example, when the intention determination value is 4, the controller 130 may determine that the intention determination value does not satisfy the third condition among the specified conditions. For example, the case where the intention determination value is 4 may include a case where the compensation steering angle is equal to or greater than the requested steering angle.

For example, even when the above-described first condition to third condition are satisfied, the controller 130 may determine that the sensing data and the intention determination value do not satisfy the specified conditions when a specific situation is identified.

For example, the controller 130 may determine that the sensing data and the intention determination value do not satisfy the specified conditions and may not perform the vehicle behavior control. The controller 130 may do so when the lateral force is equal to or smaller than the specified value, when the friction coefficient between the tire of the host vehicle and the road is equal to or smaller than a threshold value, when the heel angle and the type of the road do not satisfy a threshold criterion, when the yaw-rate value of the host vehicle is equal to or greater than a reference value, or when the sideslip angle change rate exceeds a specified range.

For example, the controller 130 may determine whether the sensing data and/or the intention determination value satisfy a specified condition based on the magnitude of the lateral force. For example, if it is determined that the magnitude of the lateral force is less than a specified value, the controller 130 may determine that the sensing data and the intention determination value do not satisfy a specified condition. The specified value may be, for example, a value smaller than the criterion for the magnitude of the lateral force, which is the criterion for determining the first condition described above.

For example, when it is determined that the sensing data and the intention determination value satisfy the specified conditions, the controller 130 may identify at least one of a braking control amount, a steering control amount for the host vehicle, or any combination thereof using at least some of the sensing data.

For example, the controller 130 may determine a distribution ratio for identifying the braking control amount using the steering torque input by the user and used for controlling the host vehicle. A description of the determination of the distribution ratio may be made in more detail later with reference to FIG. 7 below.

As an example, the controller 130 may identify the braking control amount using at least one of the lateral force, the cornering stiffness of the at least one wheel of the host vehicle, the wheelbase, the first distance from the center of gravity of the host vehicle to the center of the at least one wheel, the second distance from the center of gravity of the host vehicle to the lateral force acting point, the compensating steering angle, the distribution ratio, or any combination thereof.

For example, the controller 130 may identify the steering control amount using at least one of the lateral force, the cornering stiffness of the at least one wheel, the wheelbase, the first distance, the second distance, the compensating steering angle, the braking control amount, or any combination thereof.

For example, the controller 130 may compensate for the behavior of the host vehicle based on the braking control amount, the steering control amount, or any combination thereof.

For example, the controller 130 may perform post-processing related to at least one of a maximum value, a minimum value, a slope, or any combination thereof with respect to the braking control amount and the steering control amount. The post-processing may include, for example, a process of determining whether the identified braking control amount and steering control amount are included between the preset maximum and minimum values and adjusting some of the control amounts based on the determination result. Alternatively, the post-processing may include, for example, a process of determining whether the slopes of the identified braking control amount and steering control amount are within a preset range and adjusting some of the control amounts based on the determination result.

For example, the controller 130 may identify braking pressures respectively corresponding to the front wheel and the rear wheel of the host vehicle based on a final yaw moment identified via the result of the post-processing. The final yaw moment may be, for example, a control amount for braking control of the host vehicle determined based on the braking control amount.

For example, the controller 130 may identify a final steering torque corresponding to the steering control amount via the result of the post-processing. The final steering torque may be, for example, a control amount for the steering control of the host vehicle determined based on the steering control amount.

For example, the controller 130 may generate an output signal using at least one of the braking pressure, the final steering torque, or any combination thereof and may compensate for (or control) the behavior of the host vehicle based on the output signal.

For example, the controller 130 may determine whether to perform the behavior compensation control based on whether control signals of other control devices mounted in the host vehicle are activated and/or a priority between the control signals of other control devices and the output signal of the vehicle behavior control device 100.

Figure 2:
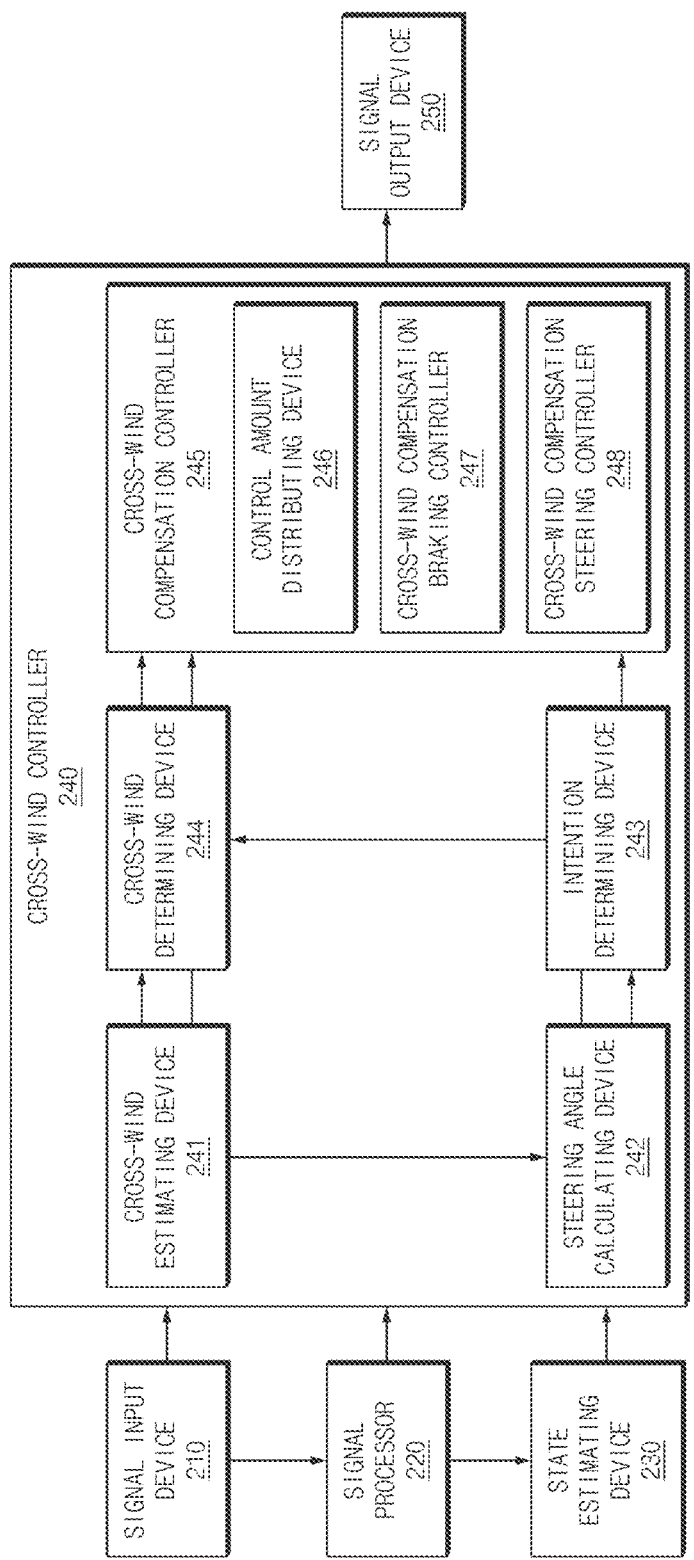
FIG. 2 is a block diagram showing components of a vehicle behavior control device according to an embodiment of the present disclosure.

FIG. 2 is a block diagram showing components of a vehicle behavior control device according to an embodiment of the present disclosure.

According to one embodiment, a vehicle behavior control device (e.g., the vehicle behavior control device 100 in FIG. 1) may include at least one of a signal input device 210, a signal processor 220, a state estimating device 230, a cross-wind controller 240, a signal output device 250, or any combination thereof.

According to one embodiment, the cross-wind controller 240 may include a cross-wind estimating device 241, a steering angle calculating device 242, an intention determining device 243, a cross-wind determining device 244, and/or a cross-wind compensation controller 245. For example, the cross-wind compensation controller 245 may include a control amount distributing device 246, a cross-wind compensation braking controller 247, and/or a cross-wind compensation steering controller 248.

According to one embodiment, at least some of the components shown in FIG. 2 may be implemented as at least a portion of the controller 130 in FIG. 1. In other words, descriptions of the components in FIG. 2 to be made later may be implemented by the controller 130 in FIG. 1.

According to one embodiment, the signal input device 210 may receive various types of signals based on a controller area network (CAN) from various components mounted on the host vehicle.

For example, the signal input device 210 may receive signals related to at least one of the steering angle, the steering angle velocity, the wheel speed, the lateral acceleration, the yaw-rate, at least one advanced driver assistance system (ADAS) operation signal of the host vehicle, or any combination thereof. For example, the at least one ADAS operation signal may include a control signal output by the control devices other than the vehicle behavior control device to control the host vehicle.

According to one embodiment, the signal processor 220 may perform various post-processing operations on at least some of the signals received by the signal input device 210.

For example, the signal processor 220 may apply offset compensation logic for at least one of the steering angle, the yaw-rate, the lateral acceleration, or any combination thereof.

For example, the signal processor 220 may perform filter (e.g., low-pass filter, LPF) processing on at least one of the steering angle, the yaw-rate, the lateral acceleration, the longitudinal acceleration, the wheel speed, or any combination thereof.

According to one embodiment, the state estimating device 230 may generate (or identify) result data of estimating at least one of a vehicle state (or the travel state) of the host vehicle, a road surface state of the road on which the host vehicle is traveling, or any combination thereof.

For example, the state estimating device 230 may identify the travel state (e.g., at least one of the vehicle speed, the sideslip angle change rate, or any combination thereof) of the host vehicle based on at least some of the signals processed via the signal processor 220.

For example, the state estimating device 230 may identify at least one of the heel angle (a bank angle) of the road, the type of the road, the degree of danger, the friction coefficient between the tire of the host vehicle and the road, or any combination thereof, based on at least some of the signals processed via the signal processor 220. The type of the road and the degree of danger may be index values digitized based on, for example, at least one of the road surface state, a road width, the heel angle of the road, or any combination thereof.

According to one embodiment, the cross-wind controller 240 may estimate the lateral force acting on the host vehicle using various data identified via the signal input device 210, the signal processor 220, and the state estimating device 230. The cross-wind controller 240 may also calculate the requested steering angle and the compensating steering angle. The cross-wind controller 240 may also determine the intention of the user. The cross-wind controller 240 may also identify a control amount for lateral force compensation control based on the dynamic behavior index of the host vehicle.

For example, the cross-wind estimating device 241 may estimate the magnitude of the lateral force acting on the host vehicle by the cross-wind or the like. As an example, the cross-wind estimating device 241 may estimate the magnitude of the lateral force based on a predefined dynamics model, but this is an example and the embodiments of the present disclosure are not limited thereto. For example, the cross-wind estimating device 241 may estimate the lateral force using at least one sensor.

For example, the steering angle calculating device 242 may identify the requested steering angle and the compensating steering angle.

For example, the requested steering angle may include a steering angle calculated by the steering angle calculating device 242 to compensate for the lateral force using at least one of the cornering stiffness of the at least one wheel of the host vehicle, the wheelbase, the first distance from the center of gravity of the host vehicle to the center of the at least one wheel, the second distance from the center of gravity of the host vehicle to the lateral force acting point, or any combination thereof.

For example, the compensating steering angle may include the angle of steering by the user for the control (e.g., the steering control) of the host vehicle. For example, the compensating steering angle may include an angle of steering by the user from when the lateral force acting on the host vehicle is equal to or greater than the specified value.

As an example, the cross-wind controller 240 may identify the compensating steering angle and the requested steering angle using the steering angle calculating device 242 only when the magnitude of the lateral force identified using the cross-wind estimating device 241 is equal to or greater than the specified value.

For example, the intention determining device 243 may calculate the intention determination value corresponding to the intention of the user using the requested steering angle, the compensating steering angle, and the steering torque. A description of an embodiment in which the intention determination unit 243 calculates the intention determination value may be replaced by the above description of FIG. 1.

For example, when it is determined that the sensing data and the intention determination value satisfy the specified conditions, the cross-wind compensation controller 245 may identify at least one of the braking control amount, the steering control amount for the host vehicle, or any combination thereof using at least some of the sensing data and then may transmit the same to the signal output device 250.

For example, the control amount distributing device 246 may identify the braking control amount and a steering angle control amount for performing the control of the host vehicle for compensating for the lateral force based on at least one dynamics model.

For example, the control amount distributing device 246 may determine the distribution ratio for identifying the braking control amount using the steering torque by the user. The control amount distributing device 246 may determine the braking control amount using at least one of the lateral force, the cornering stiffness of the at least one wheel of the host vehicle, the wheelbase, the first distance from the center of gravity of the host vehicle to the center of the at least one wheel, the second distance from the center of gravity of the host vehicle to the lateral force acting point, the compensating steering angle, the distribution ratio, or any combination thereof.

For example, the control amount distributing device 246 may identify the steering control amount using at least one of the lateral force, the cornering stiffness of the at least one wheel, the wheelbase, the first distance, the second distance, the compensating steering angle, the braking control amount, or any combination thereof.

For example, the control amount distributing device 246 may calculate the braking control amount and the steering control amount based on Mathematical Equation 4 below.

$$A = \frac{((F_w(l_N + l_W) + M_z(C_f + C_r) + (C_f C_r L)(\delta_{f,ctrl} + \delta_{comp}))V_x}{l^2 C_f C_r \left[1 - \frac{m(l_f C_f - l_r C_r)}{l^2 C_f C_r} V_x^2\right]}$$ [Mathematical Equation 4]

For example, $M_z$ may be the braking control amount, $\delta_{f,ctrl}$ may be the steering control amount, and $\delta_{comp}$ may be the compensating steering angle. Descriptions of the remaining parameters may be replaced with the description of Mathematical Equation 1.

For example, the control amount distributing device 246 may calculate the braking control amount based on Mathematical Equation 5 below using a distribution ratio $K_b$ after assuming that the yaw-rate 'A' is 0.

$$M_z = -K_b(F_w(l_N + l_W) + \frac{C_f C_r L}{C_f + C_r}\delta_{comp}$$ [Mathematical Equation 5]

For example, the control amount distributing device 246 may calculate the steering control amount based on Mathematical Equation 6 below using the calculated braking control amount.

$$\delta_{f,ctrl} = -\frac{\left(F_w(l_N + l_W) + \frac{C_f C_r L}{C_f + C_r}\delta_{comp} + M_z\right)(C_f + C_r)}{(C_f C_r L)}$$ [Mathematical Equation 6]

For example, the cross-wind compensation braking controller 247 and the cross-wind compensation steering controller 248 may perform the post-processing related to at least one of the maximum value, the minimum value, the slope, or any combination thereof with respect to the identified braking control amount and steering control amount. The post-processing may include, for example, the process of determining whether the identified braking control amount and steering control amount are included between the preset maximum value and minimum value and adjusting some of the control amounts based on the determination result. Alternatively, the post-processing may include, for example, determining whether the slopes of the identified braking control amount and steering control amount are within the preset range and adjusting some of the control amounts based on the determination result.

For example, the cross-wind compensation braking controller 247 and the cross-wind compensation steering controller 248 may identify the braking pressures respectively corresponding to the front wheel and the rear wheel of the host vehicle based on the final yaw moment identified via the result of the post-processing. The cross-wind compensation braking controller 247 and the cross-wind compensation steering controller 248 may identify the final steering torque corresponding to the steering control amount via the result of the post-processing.

For example, the cross-wind compensation braking controller 247 may identify the braking pressures respectively for the front wheel and the rear wheel based on Mathematical Equation 7 below.

$$P_{brk,f} = \frac{2R_{t,f}}{K_{b,f}T_f} M_{z,fin} r_f \quad \text{[Mathematical Equation 7]}$$

$$P_{brk,r} = \frac{2R_{t,r}}{K_{b,r}T_r} M_{z,fin}(1 - r_f)$$

For example, $P_{brk,f}$ may be the braking pressure of the front wheel, $P_{brk,r}$ may be the braking pressure of the rear wheel, $R_{t,f}$ may be a dynamic radius of a front wheel tire, $R_{t,r}$ may be a dynamic radius of a rear wheel tire, $K_{b,f}$ may be a braking gain of the front wheel, $K_{b,r}$ may be a braking gain of the rear wheel, $M_{z,fin}$ may be a final braking control amount (or the final yaw moment), and $r_f$ may be a front wheel distribution ratio of a yaw moment.

For example, the cross-wind compensation steering controller 248 may calculate the final steering torque based on Mathematical Equation 8 below.

$$T_{str,fin} = K_P \delta_{f,ctrl} \quad \text{[Mathematical Equation 8]}$$

For example, $T_{str,fin}$ may be the final steering torque, and $K_p$ may be a P gain of a control gain.

For example, the cross-wind compensation controller 245 may transmit the identified braking pressure and final steering torque to the signal output device 250.

For example, the signal output device 250 may control the host vehicle by outputting the output signal including the braking pressure and the final steering torque to compensate for the behavior of the host vehicle.

For example, the signal output device 250 may determine whether to perform the vehicle behavior control by determining the priority between the at least one ADAS signal of other control devices that are distinguished from the vehicle behavior control device and the output signal for the vehicle behavior control. For example, when some of the at least one ADAS signal have the higher priority than the output signal for the vehicle behavior control, the signal output device 250 may suspend the control of the host vehicle via the output signal until the processing of some of the at least one ADAS signal is completed even when all of the specified conditions for the vehicle behavior control are satisfied.

Figure 3:
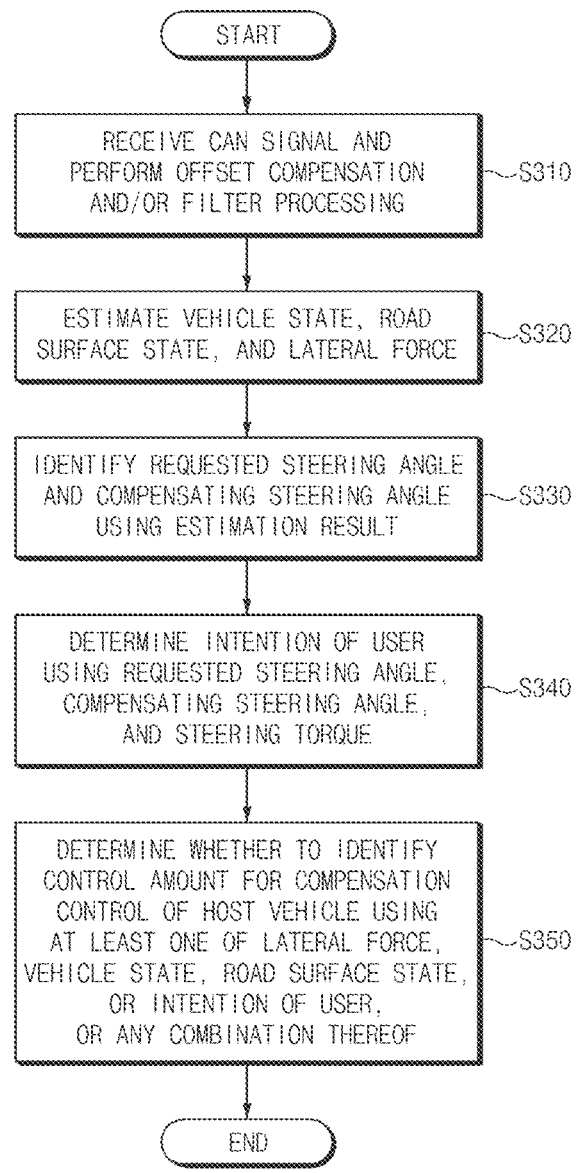
FIG. 3 is an operation flowchart of a vehicle behavior control device according to an embodiment of the present disclosure.

FIG. 3 is an operation flowchart of a vehicle behavior control device according to an embodiment of the present disclosure.

According to one embodiment, a vehicle behavior control device (e.g., the vehicle behavior control device in FIG. 1) may perform operations disclosed in FIG. 3. For example, at least some of components (e.g., the sensor element 110, the memory 120, and/or the controller 130 in FIG. 1 and/or the signal input device 210, the signal processor 220, the state estimating device 230, the cross-wind controller 240, and/or the signal output device 250 in FIG. 2) included in the vehicle behavior control device may be configured to perform the operations in FIG. 3.

In a following embodiment, operations from S310 to S350 may be sequentially performed but are not necessarily sequentially performed. For example, an order of the operations may be changed, or at least two operations may be performed in parallel. In addition, contents corresponding to or duplicated with the above-described contents with respect to FIG. 3 may be briefly described or omitted.

According to one embodiment, the vehicle behavior control device may receive a CAN signal and perform the offset compensation and/or the filter processing (S310).

For example, the vehicle behavior control device may receive various signals using the sensor element or receive various signals from the various components mounted on the host vehicle. The vehicle behavior control device may apply the offset compensation logic and/or the filter processing to at least some of the received signals.

According to one embodiment, the vehicle behavior control device may estimate (or generate) the vehicle state, the road surface state, and the lateral force (S320).

For example, the vehicle behavior control device may generate the sensing data including at least one of the steering angle of the host vehicle, the wheel speed, the yaw-rate, the lateral acceleration, the longitudinal acceleration, the ADAS signal, the vehicle speed of the host vehicle, the sideslip angle change rate, the heel angle of the road, the type of the road, the degree of danger, the friction coefficient between the tire of the host vehicle and the road, or the lateral force, or any combination thereof.

According to one embodiment, the vehicle behavior control device may identify the requested steering angle and the compensating steering angle using the estimation result (S330).

For example, the requested steering angle may include the steering angle calculated to compensate for the lateral force using at least one of the cornering stiffness of the at least one wheel of the host vehicle, the wheelbase, the first distance from the center of gravity of the host vehicle to the center of the at least one wheel, the second distance from the center of gravity of the host vehicle to the lateral force acting point, or any combination thereof.

For example, the compensating steering angle may include the angle of steering by the user for the control (e.g., the steering control) of the host vehicle.

According to one embodiment, the vehicle behavior control device may determine the intention of the user using the requested steering angle, the compensating steering angle, and the steering torque (S340).

For example, the vehicle behavior control device may determine one of the four intention determination values corresponding to the intention of the user using the requested steering angle, the compensating steering angle, or the steering torque. The four intention determination values are exemplary, and the embodiments of the present disclosure are not limited thereto. For example, the vehicle behavior control device may determine one intention determination value among four or more intention determination values via different (or more) distinguishing criteria.

According to one embodiment, the vehicle behavior control device may determine whether to identify the control amount for the compensation control of the host vehicle using at least one of the lateral force, the vehicle state, the road surface state, the intention of the user, or any combination thereof (S350).

For example, the vehicle behavior control device may determine to identify the control amount for the compensation control of the host vehicle when the lateral force, the vehicle state, the road surface state, and/or the intention of the user satisfy the specified conditions. In this case, the vehicle behavior control device may perform operation S410 in FIG. 4 to be described below.

Figure 4:
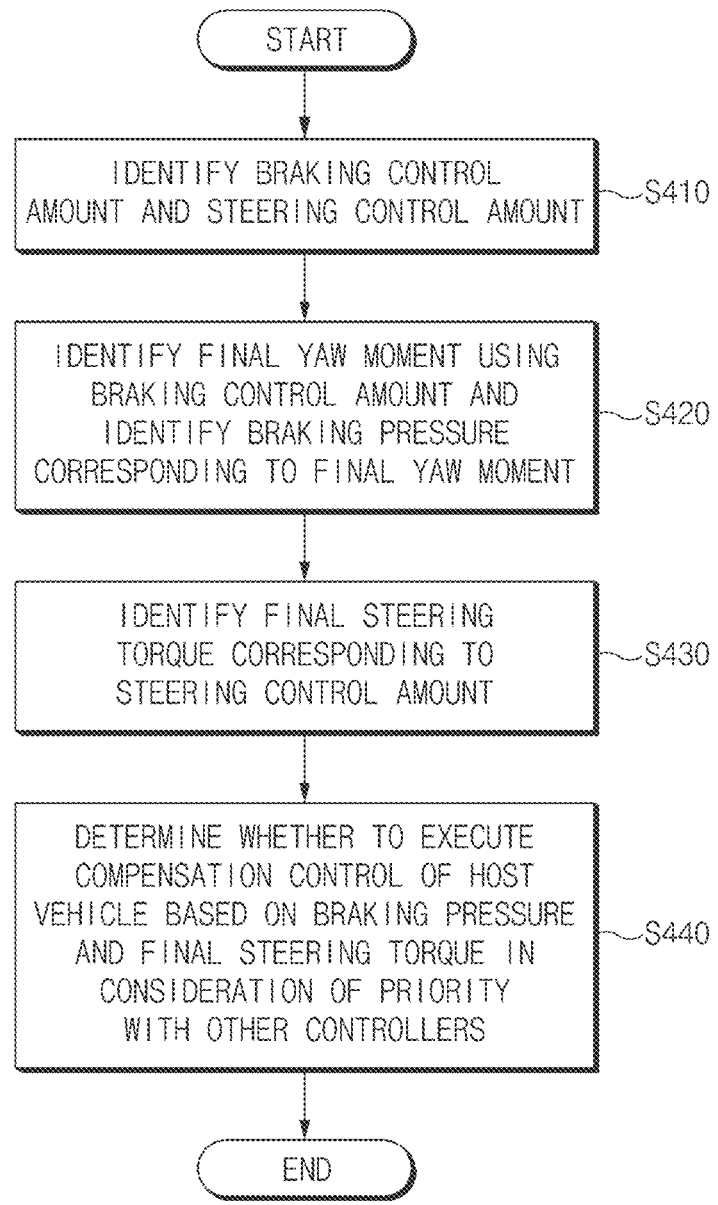
FIG. 4 is an operation flowchart of a vehicle behavior control device according to an embodiment of the present disclosure.

FIG. 4 is an operation flowchart of a vehicle behavior control device according to an embodiment of the present disclosure.

According to one embodiment, a vehicle behavior control device (e.g., the vehicle behavior control device in FIG. 1) may perform operations disclosed in FIG. 4. For example, at least some of components (e.g., the sensor element 110, the memory 120, and/or the controller 130 in FIG. 1 and/or the signal input device 210, the signal processor 220, the state estimating device 230, the cross-wind controller 240, and/or the signal output device 250 in FIG. 2) included in the vehicle behavior control device may be set to perform the operations in FIG. 4.

In a following embodiment, operations from S410 to S440 may be sequentially performed but are not necessarily sequentially performed. For example, an order of the operations may be changed, or at least two operations may be performed in parallel. In addition, contents corresponding to or duplicated with the above-described contents with respect to FIG. 4 may be briefly described or omitted.

For example, the operations in FIG. 4 may be operations of the vehicle behavior control device performed after operation S350 in FIG. 3.

According to one embodiment, the vehicle behavior control device may identify the braking control amount and the steering control amount (S410).

For example, the vehicle behavior control device may determine the distribution ratio for identifying the braking control amount using the steering torque by the user. The vehicle behavior control device may also identify the braking control amount using at least one of the lateral force, the cornering stiffness of the at least one wheel of the host vehicle, the wheelbase, the first distance from the center of gravity of the host vehicle to the center of the at least one wheel, the second distance from the center of gravity of the host vehicle to the lateral force acting point, the compensating steering angle, the distribution ratio, or any combination thereof.

For example, the vehicle behavior control device may identify the steering control amount using at least one of the lateral force, the cornering stiffness of the at least one wheel, the wheelbase, the first distance, the second distance, the compensating steering angle, the braking control amount, or any combination thereof.

According to one embodiment, the vehicle behavior control device may identify the final yaw moment using the braking control amount and may identify the braking pressure corresponding to the final yaw moment (S420).

For example, the vehicle behavior control device may perform the post-processing related to at least one of the maximum value, the minimum value, the slope, or any combination thereof on the braking control amount. The vehicle behavior control device may also identify the braking pressures respectively corresponding to the front wheel and the rear wheel of the host vehicle based on the final yaw moment identified via the result of the post-processing.

According to one embodiment, the vehicle behavior control device may identify the final steering torque corresponding to the steering control amount (S430).

For example, the vehicle behavior control device may perform the post-processing related to at least one of the maximum value, the minimum value, the slope, or any combination thereof on the steering control amount. The vehicle behavior control device may also identify the final steering torque corresponding to the steering control amount via the result of the post-processing.

According to one embodiment, the vehicle behavior control device may determine whether to execute the compensation control of the host vehicle based on the braking pressure and the final steering torque in consideration of the priority with other controllers (S440).

For example, the vehicle behavior control device may determine whether to perform the vehicle behavior control by determining the priority between the at least one ADAS signal and the output signal for the vehicle behavior control.

For example, when some of the at least one ADAS signal have the higher priority than the output signal for the vehicle behavior control, the vehicle behavior control device may suspend the vehicle behavior control until the processing of some of the at least one ADAS signal is completed even in the situation in which all of the specified conditions for the vehicle behavior control are satisfied.

For example, when some of the at least one ADAS signal have a lower priority than the output signal for the vehicle behavior control, or when the ADAS signal is not identified, the vehicle behavior control device may perform the vehicle behavior control based on the braking pressure and the final steering torque.

Figure 5:
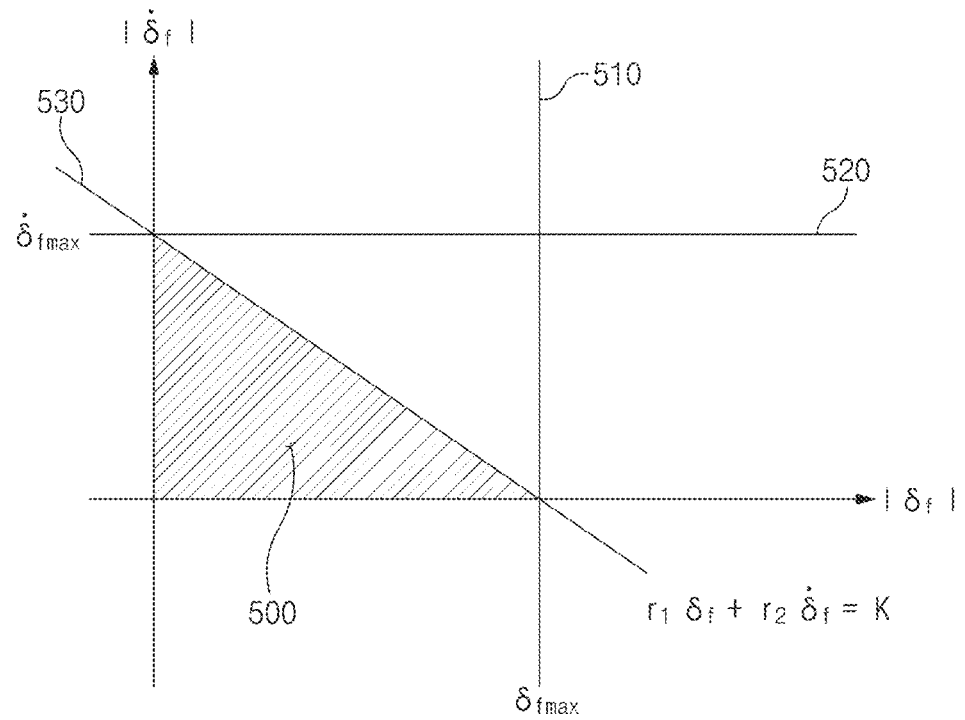
FIG. 5 is a table showing an example in which a vehicle behavior control device according to an embodiment of the present disclosure calculates maximum allowable values of a steering angle and a steering angle velocity using a constant K value.

FIG. 5 is a table showing an example in which a vehicle behavior control device according to an embodiment of the present disclosure calculates maximum allowable values of a steering angle and a steering angle velocity using a constant K value.

According to one embodiment, a vehicle behavior control device (e.g., the vehicle behavior control device 100 in FIG. 1) may identify the state (or the travel state) of the host vehicle and may determine whether the identification result is within the specified range.

According to one embodiment, when the vehicle speed of the host vehicle is equal to or higher than the specified speed and the dynamic behavior index is equal to or smaller than the preset value 'K', the vehicle behavior control device may determine that the state of the host vehicle satisfies the second condition (e.g., reference numeral S620 in FIG. 6) among the specified conditions.

For example, the vehicle behavior control device may identify the dynamic behavior index $I_{dyn}$ using the steering angle $\delta_f$ and the steering angle velocity $\dot{\delta}_f$ of the host vehicle. The dynamic behavior index $I_{dyn}$ may be, for example, a numerical value representing a potential of the host vehicle to cause a dynamic state.

For example, the vehicle behavior control device may identify the dynamic behavior index $I_{dyn}$ via Mathematical Equation 9 below.

$$I_{dyn} = r_1|\delta_f| + r_2|\dot{\delta}_f| \quad \text{[Mathematical Equation 9]}$$

For example, the vehicle behavior control device may identify the dynamic behavior index $I_{dyn}$ using the steering angle $\delta_f$, the steering angle velocity $\dot{\delta}_f$, a steering angle weight $r_1$, and a steering angle velocity weight $r_2$.

For example, the vehicle behavior control device may determine whether the dynamic behavior index $I_{dyn}$ is equal to or smaller than the preset value 'K'. Based on the dynamic behavior index $I_{dyn}$ and the preset value 'K', the vehicle behavior control device may identify a steering angle maximum value $\delta_{fmax}$ and a steering angle velocity maximum value $\dot{\delta}_{fmax}$ via Mathematical Equation below.

For example, the vehicle behavior control device may identify the dynamic behavior index $I_{dyn}$ via Mathematical Equation 10 below.

$$\delta_{fmax} = \frac{K}{r_1}, \dot{\delta}_{fmax} = \frac{K}{r_2} \quad \text{[Mathematical Equation 10]}$$

Referring to FIG. 5, according to one embodiment, an x-axis and a y-axis of the table may represent absolute values of the steering angle and the steering angle velocity, respectively.

For example, the vehicle behavior control device may determine whether the dynamic behavior index of the host vehicle is equal to or smaller than the preset value 'K' using the steering angle maximum value $\delta_{fmax}$ based on a reference numeral 510 and the steering angle velocity maximum value $\dot{\delta}_{fmax}$ based on a reference numeral 520. For example, a graph based on a reference numeral 530 may be a graph in which the steering angle $\delta_f$, the steering angle velocity $\dot{\delta}f$, the steering angle weight $r_1$, and the steering angle velocity weight $r_2$ are set in relation to the preset value 'K'. The vehicle behavior control device may refer to an area based on a reference numeral 500 as an area in a case in which the dynamic behavior index of the host vehicle is equal to or smaller than the preset value 'K'.

Figure 6:
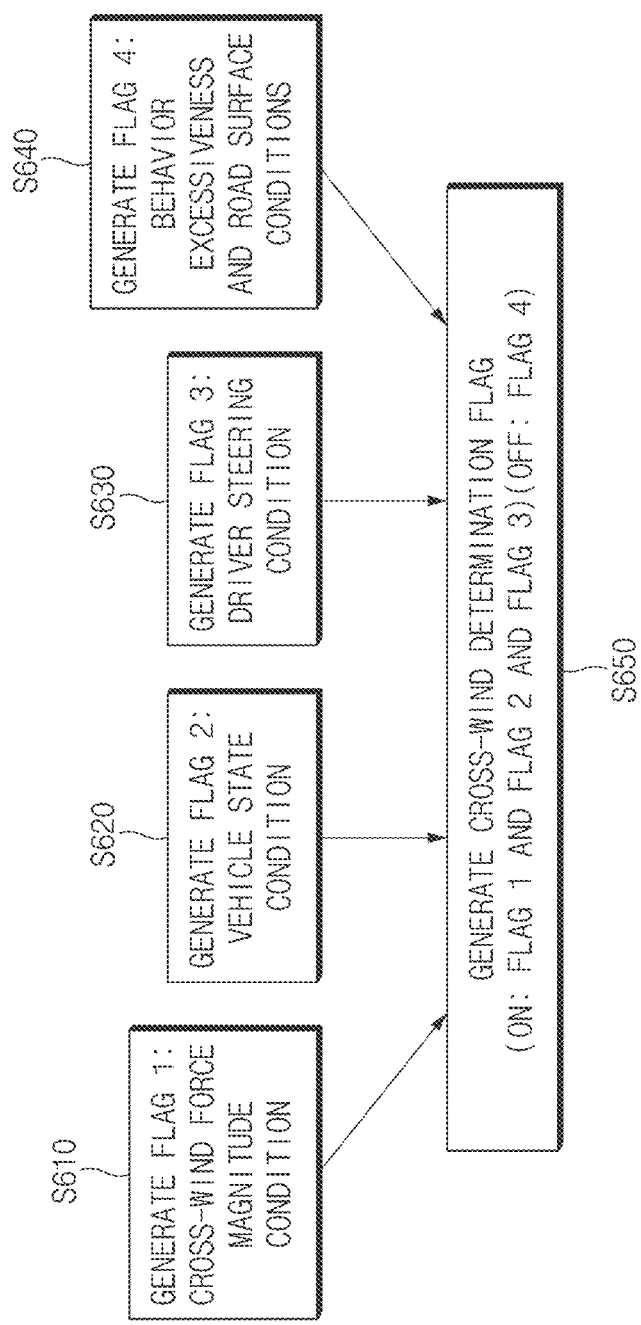
FIG. 6 is a conceptual diagram showing an operation in which a vehicle behavior control device according to an embodiment of the present disclosure determines whether specified conditions for performing lateral force compensation control are satisfied.

FIG. 6 is a conceptual diagram showing an operation in which a vehicle behavior control device according to an embodiment of the present disclosure determines whether specified conditions for performing lateral force compensation control are satisfied.

According to one embodiment, a vehicle behavior control device (e.g., the vehicle behavior control device 100 in FIG. 1) may determine whether the sensing data and/or the intention determination value satisfy conditions based on reference numerals S610, S620, S630, and S640.

Referring to reference numeral S610, according to one embodiment, the vehicle behavior control device may determine whether a cross-wind force (or the lateral force acting on the host vehicle caused by the cross-wind) is equal to or greater than a specified value.

For example, the vehicle behavior control device may determine that the lateral force among the sensing data satisfies the first condition among the specified conditions when the magnitude of the lateral force is equal to or greater than the reference lateral force and the magnitude of the differential value of the lateral force is equal to or greater than the reference differential value of the lateral force.

Referring to reference number S620, according to one embodiment, the vehicle behavior control device may determine whether the vehicle state satisfies the specified conditions.

For example, the vehicle behavior control device may determine that the travel state among the sensing data satisfies the second condition among the specified conditions when the dynamic behavior index value identified using the steering angle and the steering angle velocity of the host vehicle is equal to or smaller than the preset value (e.g., 'K' in FIG. 5) and the travel speed of the host vehicle is equal to or higher than the specified speed.

Referring to reference numeral S630, according to one embodiment, the vehicle behavior control device may determine whether the steering state of the driver (or the user) satisfies the specified conditions.

For example, the vehicle behavior control device may identify the intention determination value related to the intention of the user using at least one of the steering torque, the requested steering angle, the compensating steering angle of the host vehicle, or any combination thereof.

For example, the vehicle behavior control device may identify the intention determination value as 1 when the steering torque is equal to or smaller than the reference steering torque. The vehicle behavior control device may identify the intention determination value as 2 when the steering torque exceeds the reference steering torque and the compensating steering angle is equal to or smaller than the reference compensating steering angle. The vehicle behavior control device may identify the intention determination value as 3 when the compensating steering angle exceeds the reference compensating steering angle and is smaller than the requested steering angle. The vehicle behavior control device may identify the intention determination value as 4 when the compensating steering angle is equal to or greater than the requested steering angle.

For example, when the intention determination value is equal to or smaller than 3, the vehicle behavior control device may determine that the intention determination value satisfies the third condition among the specified conditions.

According to one embodiment, the vehicle behavior control device may identify at least one of the braking control amount, the steering control amount for the host vehicle, or any combination thereof only when all of the conditions based on reference numerals S610, S620, and S630 are satisfied.

For example, even when all of the conditions based on reference numerals S610, S620, and S630 are satisfied, the vehicle behavior control device may not identify at least one of the braking control amount, the steering control amount for the host vehicle, or any combination thereof when situations related to the host vehicle, the road surface, and/or the user correspond to at least one of situations based on reference numeral S640. In other words, in this case, the vehicle behavior control device may not perform the vehicle behavior compensation control.

Referring to reference numeral S640, according to one embodiment, the vehicle behavior control device may determine whether the behavior of the host vehicle is excessive, the road surface state of the road on which the host vehicle is traveling, and the like. Although not shown, the vehicle behavior control device may further determine the intention determination value related to the intention of the user.

For example, the vehicle behavior control device may determine that the sensing data and the intention determination value do not satisfy the specified conditions when the friction coefficient between the tire of the host vehicle and the road is equal to or smaller than the threshold value, when the heel angle and the type of the road do not satisfy the threshold criterion, when the yaw-rate value of the host vehicle is equal to or greater than the reference value, or when the sideslip angle change rate exceeds the specified range.

Referring to reference numeral S650, according to one embodiment, the vehicle behavior control device may generate a cross-wind determination flag.

For example, when flags based on reference numerals S610, S620, and S630 are in an ON (or satisfied) state and a flag based on reference numeral S640 is in an OFF state, the vehicle behavior control device may generate the cross-wind determination flag in the ON state and may perform subsequent operations (e.g., the identification of the braking control amount and the steering control amount).

For example, when at least one of the flags based on reference numerals S610, S620, and S630 is in the OFF (or unsatisfied) state or when the flag based on reference numeral S640 is in the ON state, the vehicle behavior control device may generate the cross-wind determination flag in the OFF state and suspend performing of the subsequent operations.

Figure 7:
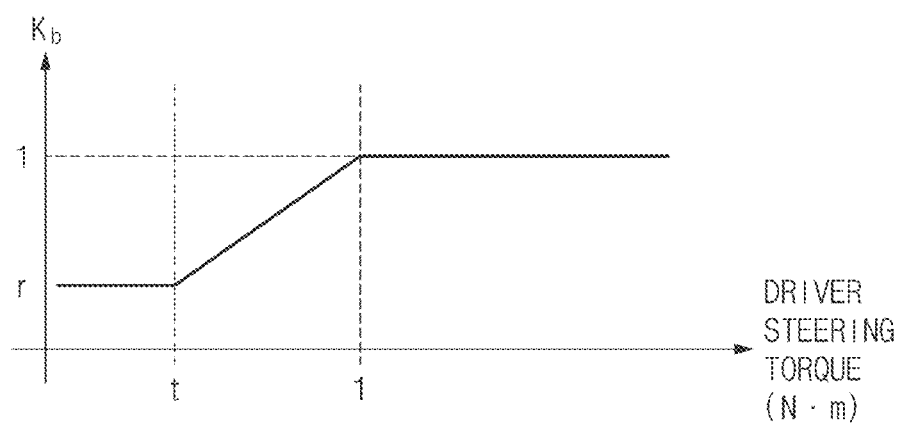
FIG. 7 is a table showing an example in which a vehicle behavior control device according to an embodiment of the present disclosure uses a driver steering torque for distributing a braking control amount.

FIG. 7 is a table showing an example in which a vehicle behavior control device according to an embodiment of the present disclosure uses a driver steering torque for distributing a braking control amount.

According to one embodiment, a vehicle behavior control device (e.g., the vehicle behavior control device 100 in FIG. 1) may determine the distribution ratio $K_b$ for identifying the braking control amount by using the steering torque by the user (or the driver).

For example, when the user steering torque is in a range from 0 to t N·m, the vehicle behavior control device may determine the distribution ratio $K_b$ as 'r'. The 'r' is a value in a range from 0 to 1, is able to be set or changed by the user and is able to be updated in real time by the vehicle behavior control device.

For example, when the user steering torque is in the range from t to 1 N·m, the vehicle behavior control device may determine the distribution ratio $K_b$ to be proportional to the user steering torque. Referring to FIG. 7, the user steering torque and the distribution ratio $K_b$ are shown to be directly proportional based on a linear function shape. However, this is an example, and the embodiments of the present disclosure are not limited thereto.

For example, the vehicle behavior control device may determine the distribution ratio $K_b$ as 1 when the user steering torque is equal to or greater than 1 N·m. In other words, the vehicle behavior control device may determine a maximum value of the distribution ratio $K_b$ as 1 no matter how great the user steering torque is. Referring to FIG. 7, the maximum value of the distribution ratio $K_b$ is shown to be the integer 1, but this is exemplary, and the embodiments of the present disclosure are not limited thereto. For example, based on at least one of a performance of the vehicle, the travel state, the road surface state, or any combination thereof, the vehicle behavior control device may change the maximum value and/or a minimum value of the distribution ratio $K_b$ in real time.

Figure 8:
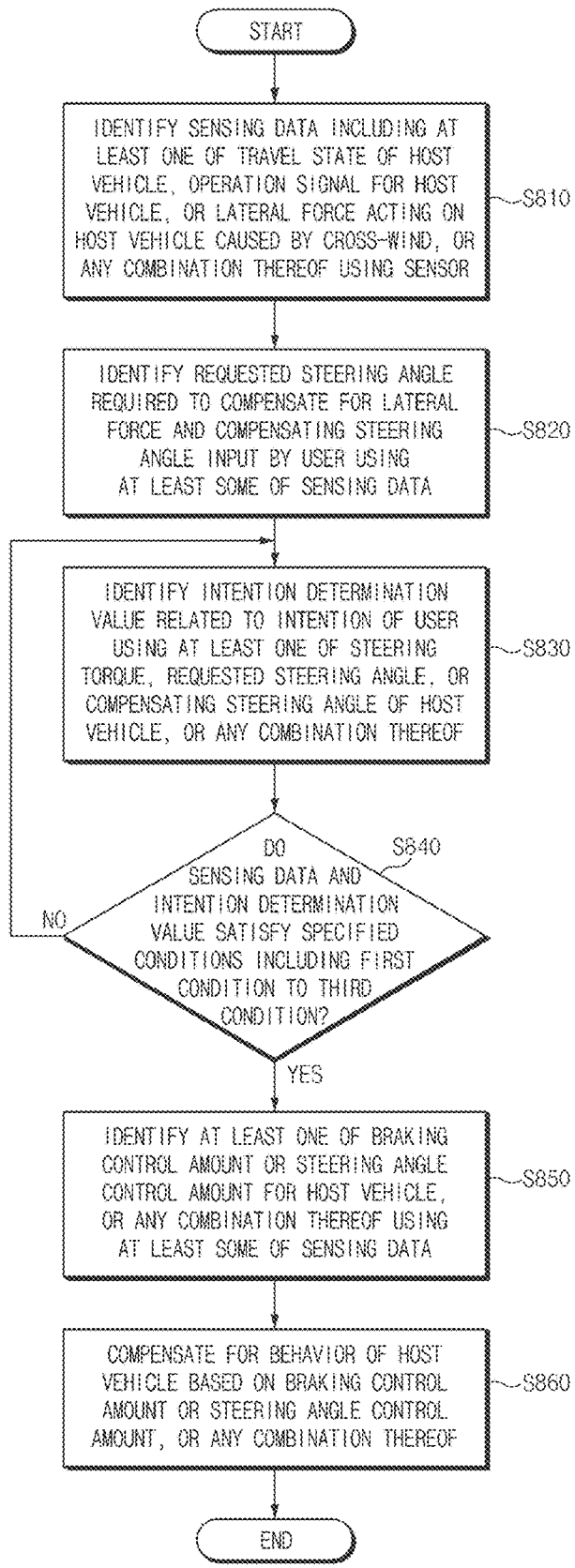
FIG. 8 is an operation flowchart of a vehicle behavior control device according to an embodiment of the present disclosure.

FIG. 8 is an operation flowchart of a vehicle behavior control device according to an embodiment of the present disclosure.

According to one embodiment, a vehicle behavior control device (e.g., the vehicle behavior control device in FIG. 1) may perform operations disclosed in FIG. 8. For example, at least some of components (e.g., the sensor element 110, the memory 120, and/or the controller 130 in FIG. 1 and/or the signal input device 210, the signal processor 220, the state estimating device 230, the cross-wind controller 240, and/or the signal output device 250 in FIG. 2) included in the vehicle behavior control device may be configured to perform the operations in FIG. 8.

In a following embodiment, operations from S810 to S860 may be sequentially performed but are not necessarily sequentially performed. For example, an order of the operations may be changed, or at least two operations may be performed in parallel. In addition, contents corresponding to or duplicated with the above-described contents with respect to FIG. 8 may be briefly described or omitted.

According to one embodiment, the vehicle behavior control device may identify the sensing data including at least one of the travel state of the host vehicle, the operation signal for the host vehicle, the lateral force acting on the host vehicle caused by the cross-wind, or any combination thereof using a sensor (S810).

For example, identifying, by the vehicle behavior control device, the sensing data using a sensor may include obtaining the raw data including at least one of the steering angle of the host vehicle, the wheel speed, the yaw-rate, the lateral acceleration, the longitudinal acceleration, the ADAS signal, or any combination thereof. Identifying, by the vehicle behavior control device, the sensing data using a sensor may also include identifying the sensing data generated by performing at least one of the offset compensation, the filter processing, or any combination thereof on at least some of the raw data.

For example, identifying, by the vehicle behavior control device, the sensing data using the sensor element may include identifying the sensing data including at least one of the vehicle speed of the host vehicle, the sideslip angle change rate, the heel angle of the road, the type of the road, the degree of danger, the friction coefficient between the tire of the host vehicle and the road, or any combination thereof.

According to one embodiment, the vehicle behavior control device may identify the requested steering angle required to compensate for the lateral force and the compensating steering angle input by the user using at least some of the sensing data (S820).

For example, identifying, by the vehicle behavior control device, at least one of the braking control amount, the steering control amount, or any combination thereof may include, when the lateral force is equal to or greater than the specified value, identifying, by the vehicle behavior control device, the requested steering angle required to compensate for the lateral force using at least one of the cornering stiffness of the at least one wheel of the host vehicle, the wheelbase, the first distance from the center of gravity of the host vehicle to the center of the at least one wheel, the second distance from the center of gravity of the host vehicle to the lateral force acting point, or any combination thereof. Identifying, by the vehicle behavior control device, at least one of the braking control amount, the steering control amount, or any combination thereof may also include identifying the compensating steering angle of the steering by the user for the control of the host vehicle.

According to one embodiment, the vehicle behavior control device may identify the intention determination value related to the intention of the user using at least one of the steering torque, the requested steering angle, the compensating steering angle of the host vehicle, or any combination thereof (S830).

For example, the vehicle behavior control device may identify the intention determination value related to the intention of the user using at least one of the steering torque, the requested steering angle, or the compensating steering angle of the user, or any combination thereof.

For example, the vehicle behavior control device may identify the intention determination value as 1 when the steering torque is equal to or smaller than the reference steering torque. For example, the case in which the intention determination value is 1 may include the case in which the user is in the hands-off state.

For example, the vehicle behavior control device may identify the intention determination value as 2 when the steering torque exceeds the reference steering torque and the compensating steering angle is equal to or smaller than the reference compensating steering angle. For example, the case in which the intention determination value is 2 may include the case in which the user does not perform the manipulation for controlling the host vehicle.

For example, the vehicle behavior control device may identify the intention determination value as 3 when the compensating steering angle exceeds the reference compensating steering angle and is smaller than the requested steering angle. For example, the case where the intention determination value is 3 may indicate the intention of the user that the compensation for the lateral force acting on the host vehicle is not sufficiently performed.

For example, the vehicle behavior control device may identify the intention determination value as 4 when the compensating steering angle is equal to or greater than the requested steering angle. The case where the intention determination value is 4 may indicate the intention of the user that the compensation for the lateral force acting on the host vehicle is sufficiently performed.

According to one embodiment, the vehicle behavior control device may determine whether the sensing data and the intention determination value satisfy the specified conditions including the first condition to the third condition (S840).

For example, the vehicle behavior control device may determine whether the first condition, the second condition, and the third condition respectively corresponding to above-described reference numerals S610, S620, and S630 in FIG. 6 are satisfied.

For example, when the sensing data and the intention determination value satisfy the specified conditions including the first condition to the third condition (e.g., operation S840—Yes), the vehicle behavior control device may perform operation S850.

For example, when the sensing data and the intention determination value do not satisfy the specified conditions including the first condition to the third condition (e.g., operation S840—No), the vehicle behavior control device may repeat operation S830.

According to one embodiment, the vehicle behavior control device may identify at least one of the braking control amount, the steering angle control amount for the host vehicle, or any combination thereof using at least some of the sensing data (S850).

For example, identifying, by the vehicle behavior control device, at least one of the braking control amount, the steering control amount, or any combination thereof may include determining the distribution ratio for identifying the braking control amount using the steering torque by the user and identifying the braking control amount. The braking control amount may be identified by using at least one of the lateral force, the cornering stiffness of the at least one wheel of the host vehicle, the wheelbase, the first distance from the center of gravity of the host vehicle to the center of the at least one wheel, the second distance from the center of gravity of the host vehicle to the lateral force acting point, the compensating steering angle, the distribution ratio, or any combination thereof.

For example, identifying, by the vehicle behavior control device, at least one of the braking control amount, the steering control amount, or any combination thereof may include identifying the steering control amount using at least one of the lateral force, the cornering stiffness of the at least one wheel, the wheelbase, the first distance, the second distance, the compensating steering angle, the braking control amount, or any combination thereof.

According to one embodiment, the vehicle behavior control device may compensate for the behavior of the host vehicle based on the braking control amount, the steering angle control amount, or any combination thereof (S860).

For example, compensating, by the vehicle behavior control device, for the behavior of the host vehicle based on the braking control amount, the steering control amount, or any combination thereof may include performing the post-processing related to at least one of the maximum value, the minimum value, the slope, or any combination thereof on the braking control amount and the steering control amount. Compensating, by the vehicle behavior control device, for the behavior of the host vehicle based on the braking control amount, the steering control amount, or any combination thereof may also include identifying the braking pressures respectively corresponding to the front wheel and the rear wheel of the host vehicle based on the final yaw moment identified via the result of the post-processing. Compensating, by the vehicle behavior control device, for the behavior of the host vehicle based on the braking control amount, the steering control amount, or any combination thereof may also include identifying the final steering torque corresponding to the steering control amount via the result of the post-processing. Compensating, by the vehicle behavior control device, for the behavior of the host vehicle based on the braking control amount, the steering control amount, or any combination thereof may also include compensating for the behavior of the host vehicle using at least one of the braking pressure, the final steering torque, or any combination thereof.

Figure 9:
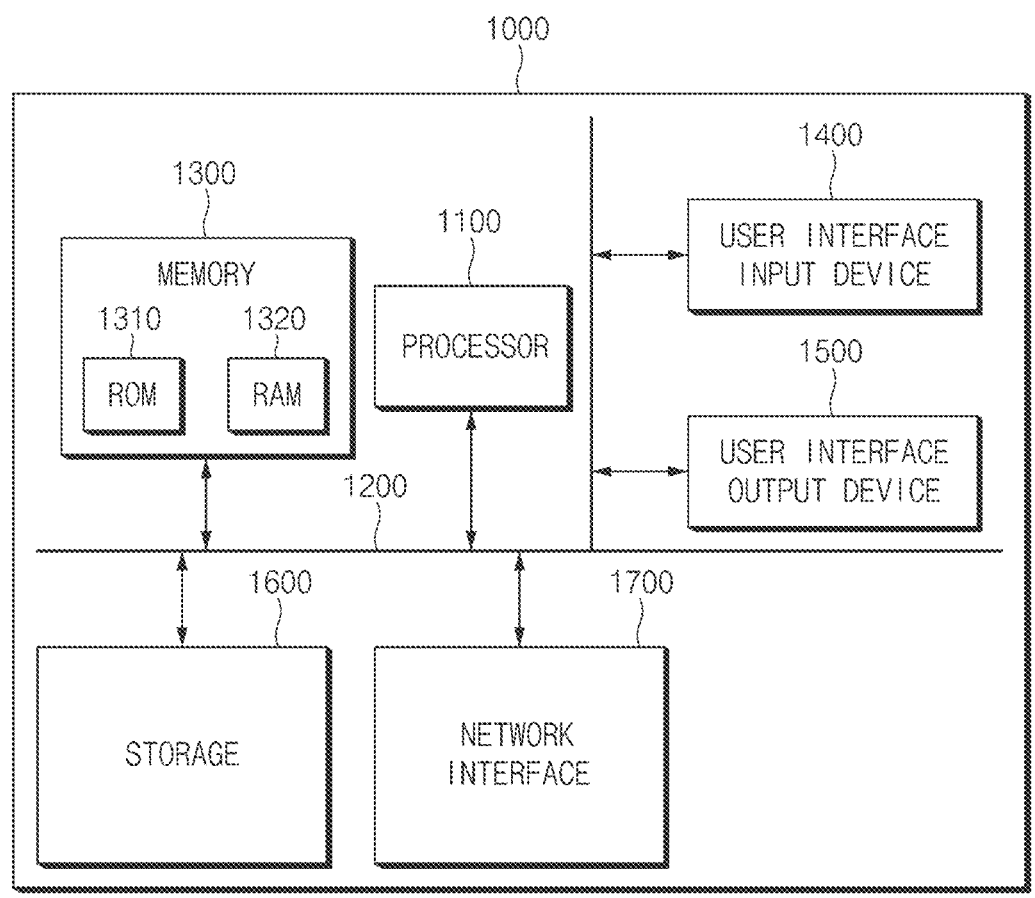
FIG. 9 shows a computing system related to a vehicle behavior control method according to an embodiment of the present disclosure.

FIG. 9 shows a computing system related to a vehicle behavior control method according to an embodiment of the present disclosure.

Referring to FIG. 9, a computing system 1000 related to the vehicle behavior control method may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware, a software module executed by the processor 1100, or in a combination thereof. The software module may reside on a storage medium (i.e., the memory 1300 and/or the storage 1600)

such as a RAM, a flash memory, a RO, an EPROM, an EEPROM, a register, a hard disk, a removable disk, and a CD-ROM.

The storage medium is coupled to the processor 1100, which may read information from and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above merely illustrates the technical idea of the present disclosure, and various modifications and changes may be made by those having ordinary skill in the art without departing from the essential characteristics of the present disclosure.

Therefore, the embodiments disclosed in the present disclosure are not intended to limit the technical idea of the present disclosure but to illustrate the present disclosure. The scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

Effects of the device and the method for controlling the behavior of the vehicle according to the present disclosure are described as follows.

According to at least one of the embodiments of the present disclosure, the vehicle behavior control device may define the dynamic behavior index representing a dynamic behavior level of the vehicle and may determine whether to perform the compensation control based on the magnitude of the defined dynamic behavior index. Thus, the vehicle behavior control (or the lateral force compensation control) may be performed in a stable situation.

In addition, according to at least one of the embodiments of the present disclosure, the intention of the user may be classified based on the result of comparison between the compensating steering angle by the user (or the driver), the requested steering angle actually required to compensate for the lateral force, and the steering torque of the host vehicle. The situation in which the lateral force compensation by the user is not sufficient may be identified. Then, the vehicle behavior control may be performed in the corresponding situation.

In addition, according to at least one of the embodiments of the present disclosure, the efficient and highly accurate vehicle behavior control may be performed by identifying the control amount to be actually compensated in consideration of the compensation control including the compensating steering angle by the user.

In addition, according to at least one of the embodiments of the present disclosure, the cooperative control for the braking and the steering may be performed, and a vehicle behavior control function that determines each control amount for the cooperative control via a specific criterion (e.g., the magnitude of the user steering torque) may be provided.

In addition, various effects identified directly or indirectly through the present document may be provided.

Hereinabove, although the present disclosure has been described with reference to embodiments and the accompanying drawings, the present disclosure is not limited thereto. The present disclosure may be variously modified and altered by those having ordinary skill in the art to which the present disclosure pertains without departing from the spirit and scope of the present disclosure claimed in the following claims.

What is claimed is:

1. A device for controlling a behavior of a vehicle, the device comprising:
   a sensor element including at least one sensor;
   a memory configured to store instructions; and
   a controller operatively connected to the at least one sensor and the memory,
   wherein the instructions, when executed by the controller, cause the device to
      identify sensing data including at least one of a travel state of a host vehicle, an operation signal for the host vehicle, a lateral force acting on the host vehicle caused by cross-wind, or any combination using the at least one sensor,
      identify an intention determination value related to an intention of a user using at least one of a steering torque, a requested steering angle, a compensating steering angle of the user, or any combination thereof,
      identify at least one of a braking control amount, a steering control amount for the host vehicle, or any combination using at least some of the sensing data when the sensing data and the intention determination value satisfy specified conditions, and
      compensate for a behavior of the host vehicle based on the braking control amount, the steering control amount, or any combination.

2. The device of claim 1, wherein the instructions, when executed by the controller, cause the device to:
   obtain raw data including at least one of a steering angle, a wheel speed, a yaw-rate, a lateral acceleration, a longitudinal acceleration, an ADAS signal of the host vehicle, or any combination using the at least one sensor; and
   identify the sensing data generated by performing at least one of offset compensation, filter processing, or any combination on at least some of the raw data.

3. The device of claim 1, wherein the instructions, when executed by the controller, cause the device to identify the sensing data including at least one of a vehicle speed of the host vehicle, a sideslip angle change rate, a heel angle of a road, a type of the road, a degree of danger, a friction coefficient between a tire of the host vehicle and the road, or any combination using the at least one sensor.

4. The device of claim 1, wherein the instructions, when executed by the controller, cause the device to:
   when the lateral force is equal to or greater than a specified value,
   identify the requested steering angle required to compensate for the lateral force, using at least one of a cornering stiffness of at least one wheel of the host vehicle, a wheelbase, a first distance from a center of gravity of the host vehicle to a center of the at least one wheel, a second distance from the center of gravity of the host vehicle to a lateral force acting point, or any combination; and
   identify the compensating steering angle by the user for control of the host vehicle.

5. The device of claim 1, wherein the instructions, when executed by the controller, cause the device to:
   determine that the lateral force among the sensing data satisfies a first condition among the specified conditions when the lateral force is equal to or greater than a reference lateral force and a differential value of the lateral force is equal to or greater than a reference differential value of the lateral force; and determine that the travel state satisfies a second condition among the specified conditions when a dynamic behavior index value identified using a steering angle and a steering angle velocity of the host vehicle is equal to or smaller than a preset value, and a travel speed of the host vehicle is equal to or higher than a specified speed.

6. The device of claim 1, wherein the instructions, when executed by the controller, cause the device to:

identify the requested steering angle required to compensate for the lateral force and the compensating steering angle input by a user, using the at least one sensor;

identify the intention determination value as 1 when the steering torque is equal to or smaller than a reference steering torque, as 2 when the steering torque exceeds the reference steering torque and the compensating steering angle is equal to or smaller than a reference compensating steering angle, and as 3 when the compensating steering angle exceeds the reference compensating steering angle and is smaller than the requested steering angle; and determine that the intention determination value satisfies a third condition among the specified conditions when the intention determination value is any one of 1, 2, or 3 or when the lateral force cannot be compensated through a manipulation of the user.

7. The device of claim 6, wherein the instructions, when executed by the controller, cause the device to:

determine that the sensing data and the intention determination value do not satisfy the specified conditions when the lateral force is smaller than a specified value, when a friction coefficient between a tire of the host vehicle and a road is equal to or smaller than a threshold value, when a heel angle and a type of the road do not satisfy a threshold criterion, when a yaw-rate value of the host vehicle is equal to or greater than a reference value, when a sideslip angle change rate exceeds a specified range, or when the compensating steering angle is equal to or greater than the requested steering angle.

8. The device of claim 6, wherein a case that the lateral force cannot be compensated through the manipulation of the user comprises:

a first case that the user is in a hands-off state, a second case that the manipulation for compensating for the lateral force is not received from the user, a third case that the lateral force is not compensated for by the manipulation received from the user, or any combination thereof.

9. The device of claim 1, wherein the instructions, when executed by the controller, cause the device to:

identify the requested steering angle required to compensate for the lateral force and the compensating steering angle input by a user, using the at least one sensor;

determine a distribution ratio for identifying the braking control amount using a steering torque by the user;

identify the braking control amount using at least one of the lateral force, a cornering stiffness of at least one wheel of the host vehicle, a wheelbase, a first distance from a center of gravity of the host vehicle to a center of the at least one wheel, a second distance from the center of gravity of the host vehicle to a lateral force acting point, the compensating steering angle, the distribution ratio, or any combination;

identify the steering control amount using at least one of the lateral force, the cornering stiffness of the at least one wheel of the host vehicle, the first distance, the second distance, the compensating steering angle, the braking control amount, or any combination; and compensate for the behavior of the host vehicle based on the braking control amount, the steering control amount, or any combination.

10. The device of claim 9, wherein the instructions, when executed by the controller, cause the device to:

perform post-processing related to at least one of a maximum value, a minimum value, or a slope, or any combination on the braking control amount and the steering control amount;

identify braking pressures respectively corresponding to a front wheel and a rear wheel of the host vehicle based on a final yaw moment identified via a result of the post-processing;

identify a final steering torque corresponding to the steering control amount via the result of the post-processing; and compensate for the behavior of the host vehicle using at least one of the braking pressures or the final steering torque, or any combination.

11. A method for controlling a behavior of a vehicle, the method comprising:

identifying, by a controller, sensing data including at least one of a travel state of a host vehicle, an operation signal for the host vehicle, a lateral force acting on the host vehicle caused by cross-wind, or any combination using a sensor;

identifying, by the controller, an intention determination value related to an intention of a user using at least one of a steering torque, a requested steering angle, a compensating steering angle of the user, or any combination thereof;

identifying, by the controller, at least one of a braking control amount, a steering control amount for the host vehicle, or any combination using at least some of the sensing data when the sensing data and the intention determination value satisfy specified conditions; and compensating, by the controller, for a behavior of the host vehicle based on the braking control amount, the steering control amount, or any combination.

12. The method of claim 11, wherein identifying, by the controller, the sensing data using the sensor includes:

obtaining, by the controller, raw data including at least one of a steering angle, a wheel speed, a yaw-rate, a lateral acceleration, a longitudinal acceleration, an ADAS signal of the host vehicle, or any combination using the sensor; and identifying the sensing data generated by performing at least one of offset compensation, filter processing, or any combination on at least some of the raw data.

13. The method of claim 11, wherein identifying, by the controller, the sensing data using the sensor includes:

identifying, by the controller, the sensing data including at least one of a vehicle speed of the host vehicle, a sideslip angle change rate, a heel angle of a road, a type of the road, a degree of danger, a friction coefficient between a tire of the host vehicle and the road, or any combination using the sensor.

14. The method of claim 11, wherein identifying, by the controller, at least one of the braking control amount, the steering control amount, or any combination includes:

when the lateral force is equal to or greater than a specified value, identifying, by the controller, the requested steering angle required to compensate for the lateral force, using at least one of a cornering stiffness of at least one wheel of the host vehicle, a wheelbase, a first distance from a center of gravity of the host vehicle to a center of the at least one wheel, a second distance from the center of gravity of the host vehicle to a lateral force acting point, or any combination; and identifying the compensating steering angle by the user for control of the host vehicle.

15. The method of claim 14, wherein identifying, by the controller, at least one of the braking control amount, the steering control amount, or any combination includes determining, by the controller, that the lateral force among the sensing data satisfies a first condition among the specified conditions when the lateral force is equal to or greater than a reference lateral force and a differential value of the lateral force is equal to or greater than a reference differential value of the lateral force, and determining, by the controller, that the travel state satisfies a second condition among the specified conditions when a dynamic behavior index value identified using a steering angle and a steering angle velocity of the host vehicle is equal to or smaller than a preset value, and a travel speed of the host vehicle is equal to or higher than a specified speed.

16. The method of claim 11, wherein identifying, by the controller, at least one of the braking control amount, the steering control amount, or any combination includes:

identifying the intention determination value as 1 when the steering torque is equal to or smaller than a reference steering torque, as 2 when the steering torque exceeds the reference steering torque and the compensating steering angle is equal to or smaller than a reference compensating steering angle, and as 3 when the compensating steering angle exceeds the compensating steering angle and is smaller than the requested steering angle; and determining that the intention determination value satisfies a third condition among the specified conditions when the intention determination value is any one of 1, 2, or 3 or in case the lateral force cannot be compensated through a manipulation of the user.

17. The method of claim 16, wherein identifying, by the controller, at least one of the braking control amount or the steering control amount, or any combination includes:

determining, by the controller, that the sensing data and the intention determination value do not satisfy the specified conditions when the lateral force is smaller than a specified value, when a friction coefficient between a tire of the host vehicle and a road is equal to or smaller than a threshold value, when a heel angle and a type of the road do not satisfy a threshold criterion, when a yaw-rate value of the host vehicle is equal to or greater than a reference value, when a sideslip angle change rate exceeds a specified range, or when the compensating steering angle is equal to or greater than the requested steering angle.

18. The method of claim 16, wherein the case that the lateral force cannot be compensated through an operation of the user comprises:

a first case that the user is in a hands-off state, a second case that the manipulation for compensating for the lateral force is not received from the user, a third case that the lateral force is not compensated for by the manipulation received from the user, or any combination thereof.

19. The method of claim 11, wherein identifying, by the controller, at least one of the braking control amount, the steering control amount, or any combination includes:

identifying, by the controller, the requested steering angle required to compensate for the lateral force and the compensating steering angle input by a user, using the sensor;

determining, by the controller, a distribution ratio for identifying the braking control amount using a steering torque by the user; identifying, by the controller, the braking control amount using at least one of the lateral force, a cornering stiffness of at least one wheel of the host vehicle, a wheelbase, a first distance from a center of gravity of the host vehicle to a center of the at least one wheel, a second distance from the center of gravity of the host vehicle to a lateral force acting point, the compensating steering angle, the distribution ratio, or any combination;

identifying, by the controller, the steering control amount using at least one of the lateral force, the cornering stiffness of the at least one wheel of the host vehicle, the first distance, the second distance, the compensating steering angle, the braking control amount, or any combination; and compensating, by the controller, for the behavior of the host vehicle based on the braking control amount, the steering control amount, or any combination.

20. The method of claim 19, wherein compensating, by the controller, for the behavior of the host vehicle based on the braking control amount, the steering control amount, or any combination includes:

performing, by the controller, post-processing related to at least one of a maximum value, a minimum value, a slope, or any combination on the braking control amount and the steering control amount;

identifying, by the controller, braking pressures respectively corresponding to a front wheel and a rear wheel of the host vehicle based on a final yaw moment identified via a result of the post-processing;

identifying, by the controller, a final steering torque corresponding to the steering control amount via the result of the post-processing; and compensating, by the controller, for the behavior of the host vehicle using at least one of the braking pressures, the final steering torque, or any combination.

* * * * *